Nov. 24, 1964     C. R. ALLEN     3,158,146
SWINGING FRAME CONTOUR WIRE SAW
Filed May 28, 1962     3 Sheets-Sheet 1
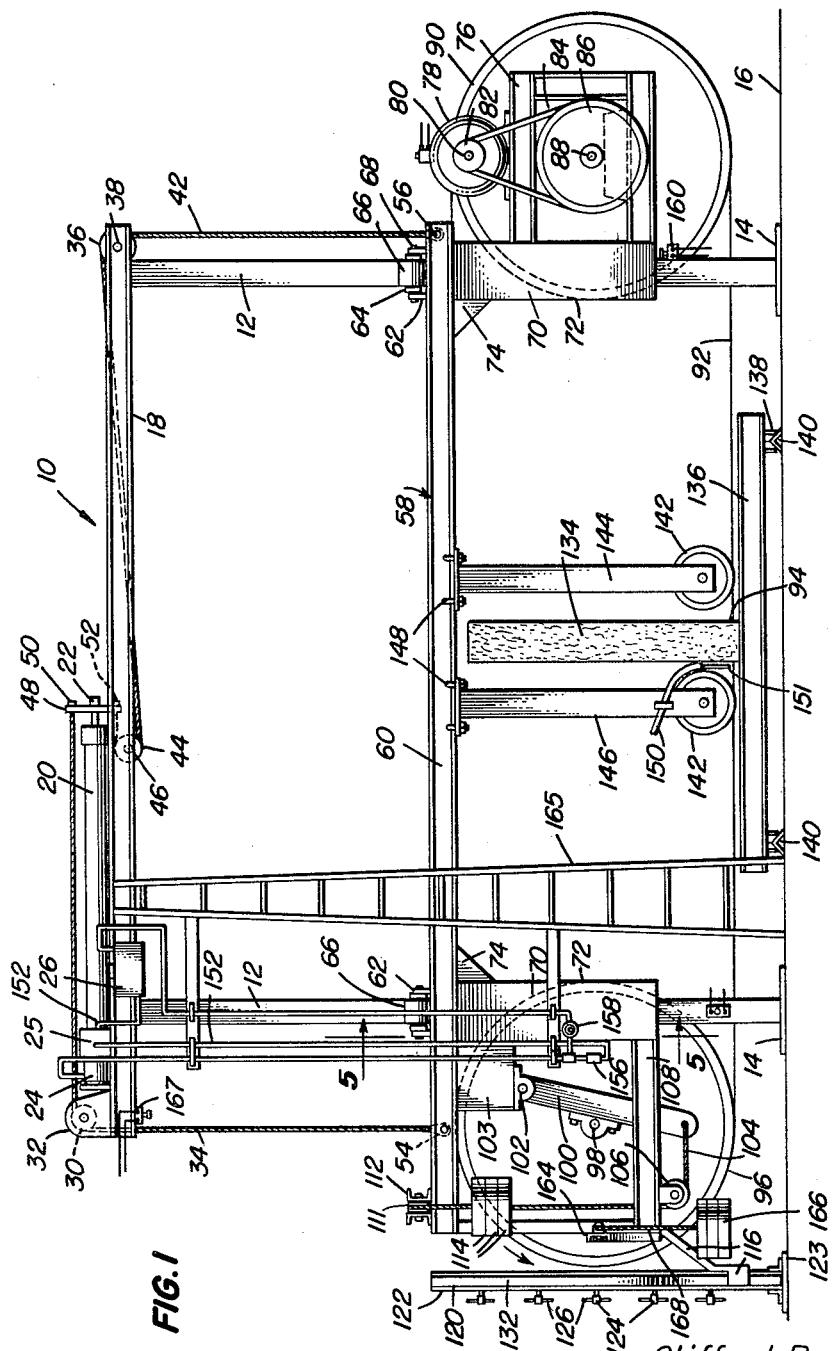
FIG. I
INVENTOR
Clifford R. Allen
BY Gustave Miller
ATTORNEY

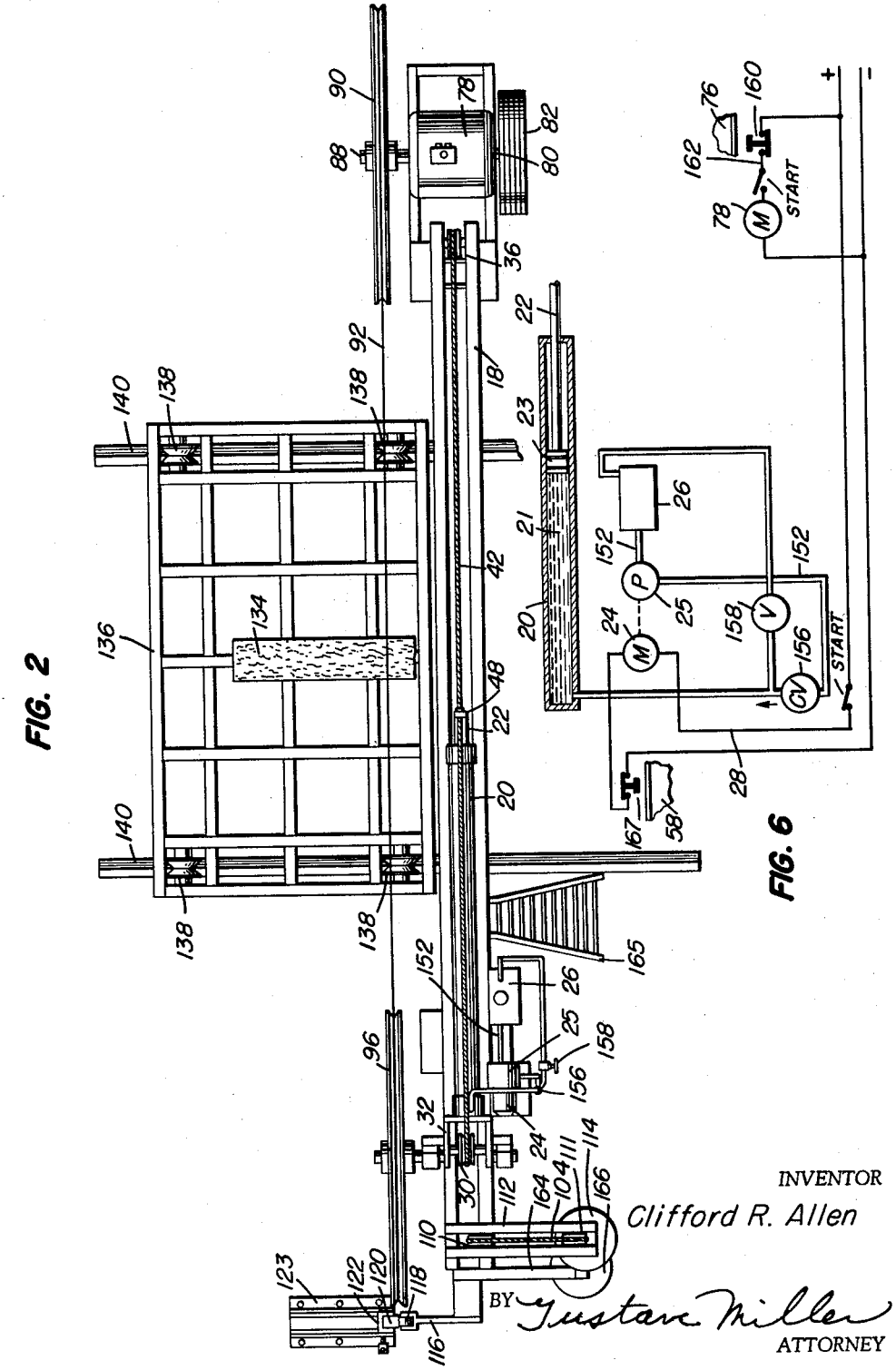

Nov. 24, 1964         C. R. ALLEN         3,158,146
SWINGING FRAME CONTOUR WIRE SAW
Filed May 28, 1962         3 Sheets-Sheet 3
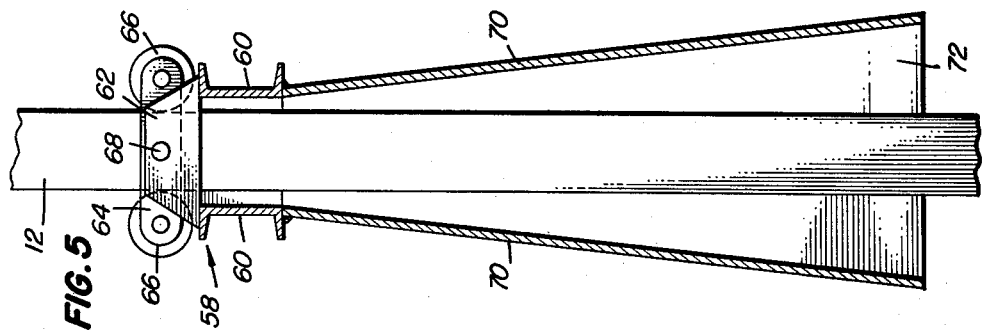
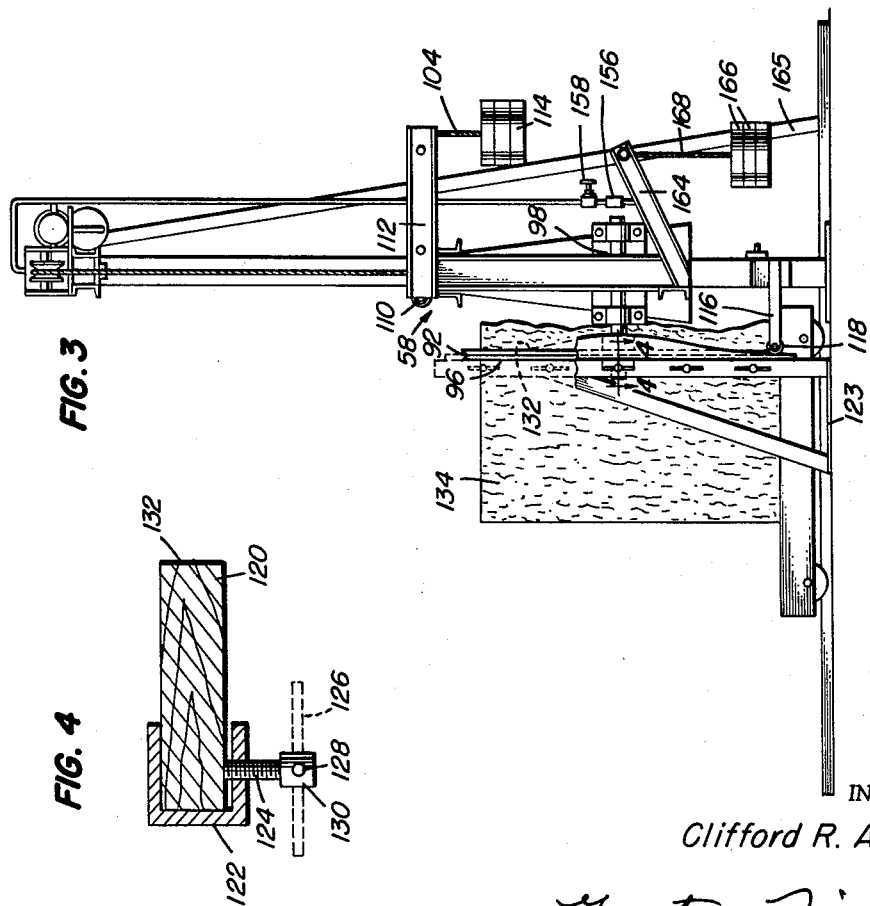
INVENTOR
Clifford R. Allen
BY
ATTORNEY

United States Patent Office 3,158,146
Patented Nov. 24, 1964

3,158,146
SWINGING FRAME CONTOUR WIRE SAW
Clifford R. Allen, % Granite City Iron Works Co.,
19 4th Ave. N., St. Cloud, Minn.
Filed May 28, 1962, Ser. No. 197,948
6 Claims. (Cl. 125—21)

This invention relates to a swinging frame contour wire saw and is directed more particularly to a contour wire saw which will cut patterns in stone and similar workpieces.

A further object of this invention is to provide a contour wire saw for cutting stone or like workpieces wherein the cutting run of the wire saw will swing automatically back and forth in conformance with the contour of a pattern and wherein the operator need not operate any manual control or labor in keeping the cutting run of the wire saw properly positioned against the stone.

A further object of this invention is to provide a contour cutting saw for stone or like workpieces which does not entail a complicated mechanism and electrical control to accomplish the sawing, but wherein the cutting run is automatically maintained by gravity to cooperate with a pattern which it will follow to cut a like contour in the stone or workpiece.

A further object of this invention is to provide a contour cutting saw or stone, or like workpieces, wherein the saw is mounted on a saddle frame that can swing in conformity with the contour of a pattern and cut the same pattern into the workpiece.

Still a further object of this invention is to provide a cutting run of a contour wire saw wherein the cutting run is maintained in a horizontal direction that it can swing back and forth freely in conformance with the contour that is desired to cut in the workpiece.

Still a further object of this invention is to provide a swinging frame contour wire saw for cutting stone workpieces which can be set into operation with a minimum amount of effort and which once set in operation can continue to perform with practically no supervision until the cutting run is completed and which may be made capable of shutting off its operation automatically when the cutting run has completed the sawing action through the workpiece.

With the above and related objects in view, this invention consists in the details of construction and combination of parts, as will be more fully understood from the following description, when read in conjunction with the accompanying drawings in which:

FIG. 1 is a front elevational view of the machine in operative position.

FIG. 2 is a top plan view of the machine.

FIG. 3 is an end elevational view.

FIG. 4 is a detailed view on line 4—4 of FIG. 3.

FIG. 5 is a detailed view, on an enlarged scale, on line 5—5 of FIG. 1.

FIG. 6 is a schematic diagram of the wire and pump circuits.

There is shown at 10 the swinging frame contour wire saw of this invention for cutting stone or other like workpieces to a desired profile or contour, the workpieces being, of course, such as are used in the fabrication of copings, monuments, cornices and other like objects of heavy hard material where the individual workpiece may weigh as much as a ton or more and obviously is hard to readily manipulate.

This device 10 includes a pair of spaced apart vertical uprights 12 rigidly secured to a firm foundation 14 which, of course, may consist of reinforced concrete blocks sunk below the floor level 16, the floor level being of suitable construction. These uprights 12 may be of a 5-inch square tubing. Secured to the tops of these two uprights 12 is a bridge 18 which may consist of a 5-inch channel bar. Supported on this bridge 18, which bridge 18 with the uprights 12 provides the main frame, is a hydraulic hoisting cylinder 20 wherein a piston rod 22 is actuated by means of fluid pressure 21 on a piston 23 therewithin, provided by an electric motor 24 operating a pump 25 with hydraulic fluid from an oil supply tank 26, a power wire 28 leading to the electric motor 24.

Three pulleys are journaled on the bridge 18, one pulley 30 being journaled in a bracket 32 at one end thereof for one hoist cable 34 to pass thereover. A second pulley 36 is journaled in the other end of the bridge 18 as at 38 for the other cable 42 to pass thereover. A third pulley 44 is journaled in the bridge member 18 at 46 so as to reverse the direction of movement of the end 52 of the hoisting cable 42. A yoke arm 48 mounted on the extending end of the piston rod 22 has the end 50 of hoist cable 34 and end 52 of hoist cable 42 secured thereto. From this construction, it will be apparent that movement of the piston rod 22 in a direction outside of and away from the cylinder 20 will cause both hoist cables 34 and 42 to move in a lifting direction, and that when the piston rod 22 is permitted to move into the cylinder 20, both hoist cables 34 and 42 will be permitted to move downwardly, and at all times both cables 34 and 42 will move at the same rate of speed. Supported on the lower end 54 of hoist cable 34 and end 56 of hoist cable 42 is a saddle frame 58.

This saddle frame 58 consists of a pair of U-beams 60 linked together by two pairs of plates 62, and otherwise secured together as a rigid unit. Each pair of linking plates 62 is pivotally secured at 68 to a carriage 64 which includes a pair of rollers 66 contacting opposite sides of the square uprights 12. As result of this construction, it will be obvious that the U-beams 60 of saddle frame 58 may be lifted up or travel downwardly by means of the post cables 34 and 42 and be guided in their vertical travel by the carriages 64 to which they are pivoted as at 68. The carriages 64 fit snuggly enough against the uprights 12 to prevent any vibration thereof. The U-beams 60 are sufficiently spaced from the uprights 12, as illustrated in FIG. 5, to permit the saddle frame 58 to pivot or swing to the desired limits about the pivot 68. Flared skirts 70 extend from the bottom of the U-beams 60 in the area of the uprights 12, the two flared skirts 70 being connected by side skirts 72.

Reinforcing triangular plates 74 help brace the inner skirts 72 to the U-beams 60. At one end of U-beams 60, for instance, the end to which hoist cable 42 is attached, there is secured a rectangular framework 76 on which is supported an electric motor 78 having a suitable electric line schematically shown at 162. Mounted on the motor shaft 80 is a pulley 82 for pulley belt 84 delivering power to a pulley 86 on a shaft 88 of a sheave 90 over which passes a conventional saw wire 92, the diameter of this sheave 90 being of substantial size as illustrated. The sheave 90 constitutes the drive wheel for the cutting run 94 of the sawing wire 92 which normally travels at 4200 f.p.m.

A similar driven sheave 96 is journaled at 98 on an arm 100 pivoted at 102 to a supporting plate 103 secured between the U-beams 60 and the adjacent skirt 70. This idler driven sheave 96 maintains tension on the cutting wire 92 by having a cable 104 secured to its lower end and passing around a pulley 106 mounted on an arm 108 secured to the bottom of the same skirt 70, the cable 104 extending upwardly over a pulley 110 at one end of an arm 112 supported on the saddle frame 58 and extending to the side of saddle frame opposite from that on which the sheave 96 is journaled, the cable 104 then passing over another pulley 111 at the outer end of arm 112 and having a plurality of weights 114 supported thereon, the weights 114 thus serving to pivot the arm 108 in a direction to exert tension on the saw wire 92. It also tends to balance the weight of the sheave 96 and, of course, the number of weights 114 may be varied as desired. As a result of such construction, the saddle frame 58 with the parts thus far described may pivot or swing freely on the pivots 68 of carriages 64.

In order to control the pivoting or swinging movement of the saddle frame, a stylus arm 116 extends from the arm 108 of saddle frame 58 and terminates in a stylus roller 118 on the end thereof.

A wooden pattern 120 is held in an upright position holding U-member 122, supported on a base plate 123, by means of stud screws 124, inserted therein to one side thereof and controlled by handles 126 secured through apertures 128 in the head 130 of stud screws 124. The pattern 120 has its profile 132 shaped to conform to the desired pattern that is to be cut into the stone or workpiece 134 and this pattern 120 may thus be readily changed for another pattern of any suitable contour.

To insure that the saddle frame 58 will swing the stylus 116 and stylus roller 118 against the contour 132 of pattern 120 and keep it in contact therewith at all times, a counter-weight arm 164 is secured to arm 108 thereof, this arm 164, as shown in FIG. 3, extends to the side of the saddle frame 58 opposite to which the stylus 116 extends, and is provided with a weight 166 supported on a cable 168 at the end thereof. Obviously, more or less weights 166 may be removably supported on this cable 168 so as to cause the proper amount of pressure of the stylus roller 118 against the pattern contour 132.

The stylus roller 118 contacting the contour 132 of pattern 120 will cause the saddle frame 58 to swing or pivot in conformity therewith and thus cause the horizontal cutting run 94 to follow the same path as it is moved downwardly in its sawing action through the stone or workpiece 134.

The stone or workpiece 134 which may weigh a ton or more, is placed on a stone car 136 having wheels 138 mounted on a trackway 140 on the surface 16 so that the stone or workpiece 134 may be readily moved to the position beneath the cutting run 94 at the beginning of the operation and thereafter readily removed away from position therebeneath for removal by other means. The cutting run 94 is maintained in an absolutely horizontal position because of the fact that on both sides of the workpiece 134, it passes beneath two idler sheaves 142 mounted on depending extensions 144 and 146 which are adjustably clamped at 148 in spaced apart relation on the bottom flanges of the U-beams 60 so that the extension 144 and 146 may be spaced suitable distances apart according to the thickness of the workpiece 134.

The saw wire 92 may be of any conventional construction; it may be provided with conventional diamond chips for providing a cutting service or alternatively a suitable abrasive such as emery grains may be fed through a tube 150 from a suitable source of supply (not shown) in a fluid such as water as at 151 onto the cutting run 94 just as it contacts the workpiece 134.

Before the cutting run 94 of the saw wire 92 can operate on the workpiece 134, the saddle frame 58 must be lifted up to bring the cutting run 94 above the workpiece 134 and permit the workpiece 134 to be placed in proper position. This lifting is provided by operating electric pump 25 by motor 24 by means of the power supply 28, the fluid from oil supply tank 26 being pumped into the cylinder 20 behind the piston of the piston bar 22 through a conduit 152 connecting the tank 26 to the pump 25. As the motor 24 operates the pump 25 the piston rod 22 moves the piston yoke 48 to the right, as shown in FIGS. 1 and 2, thereby causing hoist cables 34 and 42 to lift the saddle frame 58 to bring the cutting run 94 above the workpiece 134, thus permitting the workpiece 134 to be moved into proper position.

Obviously, a cut-off switch 167 in line 28 may be placed in the upper path of the saddle frame 58 just below the bridge 18 to automatically cut off the lifting of saddle frame 58. A check valve 156 automatically prevents the return of the fluid from the cylinder 20 through pump 25 to the tank 26 thus holding the saddle frame 58 in raised position. After the workpiece 134 has been put in proper position, and the appropriate pattern 120 has been secured in the pattern holder 122, a needle valve 158 by-passing the check valve 156 is controllably opened to the proper amount to permit the fluid to slowly drain back from the cylinder 20 to the tank 26 and to permit the saddle frame to descend at the desired rate as the cutting run 94 saws through the workpiece 134. With the motor 78 operating and the needle valve 158 properly opened, thus by-passing the check valve 156, the cables 34 and 42 will descend at the proper rate as the cutting run 94 saws through the workpiece 134, the cutting run 94 swinging back and forth in conformity to the contour 132 of the pattern 120 until the cutting run has descended entirely through the workpiece to the bottom thereof and completed the operation. At this point, a suitable cut-off switch 160 may be provided in the power supply 162 to the motor 78 so as to automatically disconnect the operation of motor 78 and the same switch 160 may also operate an alarm bell or signal device (not shown) for calling attention to the fact that the cutting operation has been completed.

A support for the conduit 152 and the cable 28 to motor 24 is provided by a ladder 165 which also serves to facilitate access to the bridge 18 and the pump 25, motor 24 and cylinder 20 when necessary.

The saddle frame 58 and cutting run 94 will, therefore, swing in conformity with the contour of the pattern 132 as it cuts through the workpiece 134 and provide the same contour in the workpiece 134 as that of the contour 132 of pattern 120 and by including the cut-off switches, as pointed out, stop switch 167 would limit the lifting of the saddle frame 58, the cut-off switch 160 will stop the operation of the cutting run 94 when the cutting is completed and may simultaneously operate a signal to notify the operator that such cutting is completed, thereby eliminating the need for constant supervision by the operator doing the cutting.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In a machine for cutting stone or the like, a driven endless sawing wire with means for mounting and driving it to provide a cutting run that is disposed horizontally, said means permitting the cutting run to swing back and forth and be shifted downwardly, including a vertically extending pattern holder, and means in said holder for readily removably securing a selected pattern thereto to control the swing of the cutting run, said first mentioned means also including a saddle frame mounted for controlled vertical travel downwardly, vertically movable carriage means, pivot means suspending said saddle means on said carriage means, stylus means fixed on said saddle frame and extending from said saddle frame against said pattern, and means urging said stylus means against said pattern to control the swing path of said cutting run.

2. In a machine for cutting stone or the like, a main frame comprising a pair of spaced apart uprights, a bridge supported on said uprights, a saddle frame pivotally suspended on carriage means travelling vertically on said uprights, controllable suspending means mounted on and depending from said bridge and connected to said saddle frame for lifting and lowering said carriage means and said pivotally connected saddle frame, a pair of sheaves journaled to opposite ends of said saddle frame, an endless sawing wire extending about said pair of sheaves providing a horizontally disposed cutting run therebetween, means for driving one of said sheaves, means for urging the other of said sheaves away from said driven sheave to maintain said cutting run under tension, means for securing a pattern adjacent said pivotally suspended saddle frame, and means urging said saddle frame to swing against a selected pattern mounted in said pattern securing means and cause said cutting run to follow said pattern to cut a stone workpiece to the contour of the pattern.

3. In a machine for cutting stone or a like workpiece, a pair of spaced apart uprights, carriage means mounted for vertical travel on said uprights, a bridge supported on said uprights, a horizontally extending saddle frame pivoted on said carriage means, cable means to which said saddle frame is suspended, cable travel control means mounted on said bridge, a drive sheave journaled to one end of said saddle frame, an idler sheave, means journalling said idler sheave to the other end of said saddle frame, an endless sawing wire extending about said sheaves, means urging said idler sheave journal means in a direction away from said drive sheave to maintain tension on a horizontal cutting run of said sawing wire between said sheaves, a pattern secured adjacent said saddle frame, a stylus fixed on said saddle frame, means urging said stylus against said pattern to swing said saddle frame and cause said cutting run to follow the profile of said pattern as said cutting run passes through a stone workpiece as said cable means permits said suspended saddle means to travel downwardly.

4. The machine of claim 3, said pattern securing means being located at one side of said saddle frame, said means urging said stylus comprising weight means extending to the opposite side of said saddle frame.

5. The machine of claim 3, and a pair of spaced apart idler guide wheels adjustably secured to said saddle frame for maintaining the cutting run in horizontal position.

6. The machine of claim 3, said cable travel control means comprising a hydraulic cylinder and piston, said cable means being connected to said piston, pump means connected by a conduit means to said cylinder to actuate said piston to lift said cable means and lift said carriage means and saddle frame, check valve means in said conduit means for holding cable means in position, and adjustable needle valve means in said conduit means for controllably dropping said cable means, said carriage means and said saddle frame.

References Cited in the file of this patent
UNITED STATES PATENTS

| | | |
|---|---|---|
| 610,653 | Lautz | Sept. 13, 1898 |
| 1,706,406 | Legge | Mar. 26, 1929 |
| 2,674,238 | Dessureau | Apr. 6, 1954 |
| 2,792,825 | Letter | May 21, 1957 |
| 2,803,239 | D'Avaucourt | Aug. 20, 1957 |
| 2,866,448 | Dessureau | Dec. 30, 1958 |

FOREIGN PATENTS

| | | |
|---|---|---|
| 359,817 | France | Oct. 27, 1906 |
| (6,569 1st addition) | | |